United States Patent [19]

Chi

[11] Patent Number: 5,297,811
[45] Date of Patent: Mar. 29, 1994

[54] JOURNAL OF A BICYCLE HEAD SET

[76] Inventor: Yi C. Chi, No. 139-5, An Mei Rd., Mei Shan Village, Hou Li Hsiang, Taichung Hsien, Taiwan

[21] Appl. No.: 974,880

[22] Filed: Nov. 12, 1992

[51] Int. Cl.⁵ .......................................... B62K 19/32
[52] U.S. Cl. .................................. 280/280; 411/432; 411/433
[58] Field of Search .................. 280/279, 280, 276; 74/502.4; 411/433, 432, 937.2

[56] References Cited

U.S. PATENT DOCUMENTS

| | | | |
|---|---|---|---|
| 4,946,181 | 8/1990 | Romano | 280/279 |
| 4,960,342 | 10/1990 | Chi | 280/279 |
| 5,178,035 | 1/1993 | D'Aluisio | 280/280 |

FOREIGN PATENT DOCUMENTS

| | | | |
|---|---|---|---|
| 1144142 | 2/1963 | Fed. Rep. of Germany | 280/280 |
| 302483 | 10/1965 | Netherlands | 280/280 |
| 1286 | of 1896 | United Kingdom . | |

Primary Examiner—Margaret A. Focarino
Assistant Examiner—Kevin Hurley
Attorney, Agent, or Firm—Mason, Fenwick & Lawrence

[57] ABSTRACT

A journal includes a cap engaged on a steerer tube, a bearing engaged on the cap, a compression nut threadedly engaged on the steerer tube, an annular flange extended upward from the compression nut, a pair of fins formed in the annular flange, and a split ring engaged on the annular flange. The split ring includes two half appendages fixed together to compress the fins radially inwards in order to compress the steerer tube, whereby, the compression nut is fixed to the steerer tube.

1 Claim, 2 Drawing Sheets

JOURNAL OF A BICYCLE HEAD SET

BACKGROUND OF THE INVENTION

1. Field of the Invention

The present invention relates to a journal, and more particularly to a journal of a bicycle head set.

2. Description of the Prior Art

A typical journal of a head set is disclosed in U.K. Pat. No. 1286 to Pihlfeldt, filed Jan. 18, 1896. In this patent, a split lug is rotatably engaged on a bearing and is fixed together by a screw pin so that the tongue is forcibly impressed against the stem of the steering handles. However, when the stem is compressed by the tongue, the outer thread formed on the stem will be damaged by the tongue such that the parts can not be smoothly moved and rotated.

Another type of journal is disclosed in U.S. Pat. No. 4,946,181 to Romano, filed Apr. 21, 1989. In this patent, a split ring is engaged on the upper portion of the compression nut and includes an appendage for supporting a flexible cable. The configuration is complicated and is inconvenient when the compression nut becomes loose. The split ring should be removed before the compression nut can be driven. In addition, two compression nuts are required to fix the journal in place. Furthermore, the split ring should be arranged in a particular angular position relative to the compression nut such that the split ring can be engaged on the compression nut.

present invention has arisen to mitigate and/or obviate the afore-described disadvantages of the conventional journals of the bicycle head sets.

SUMMARY OF THE INVENTION

The primary objective of the present invention is to provide a journal of a head set which can be easily assembled and can be easily disengaged from the steerer tube.

In accordance with one aspect of the invention, there is provided a journal comprising a cap engaged on a steerer tube, a bearing engaged on the cap, a compression nut threadedly engaged on the steerer tube and including an annular flange extended upward therefrom, a gap formed in the annular flange and arranged such that a pair of fins are formed in the annular flange, and a split ring engaged on the annular flange of the compression nut and including two half-appendages, and means coupling the two half-appendages together so as to clamp the fins and so as to compress the fins radially inwards to compress the steerer tube, whereby, the compression nut is fixed to the steerer tube. The split ring is provided for holding a flexible cable.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
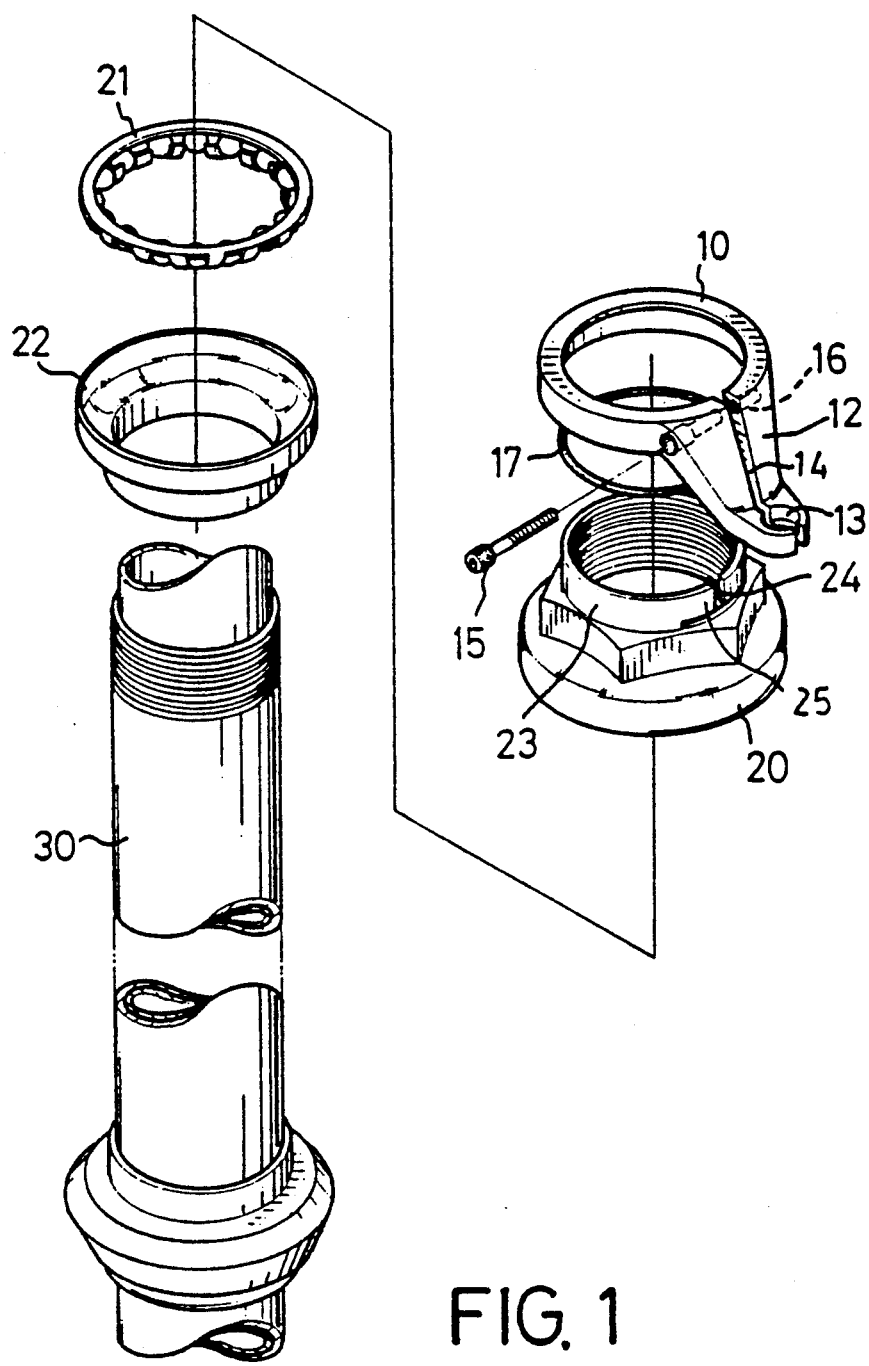
FIG. 1 is an exploded view of a journal of a head set in accordance with the present invention.
Figure 2:
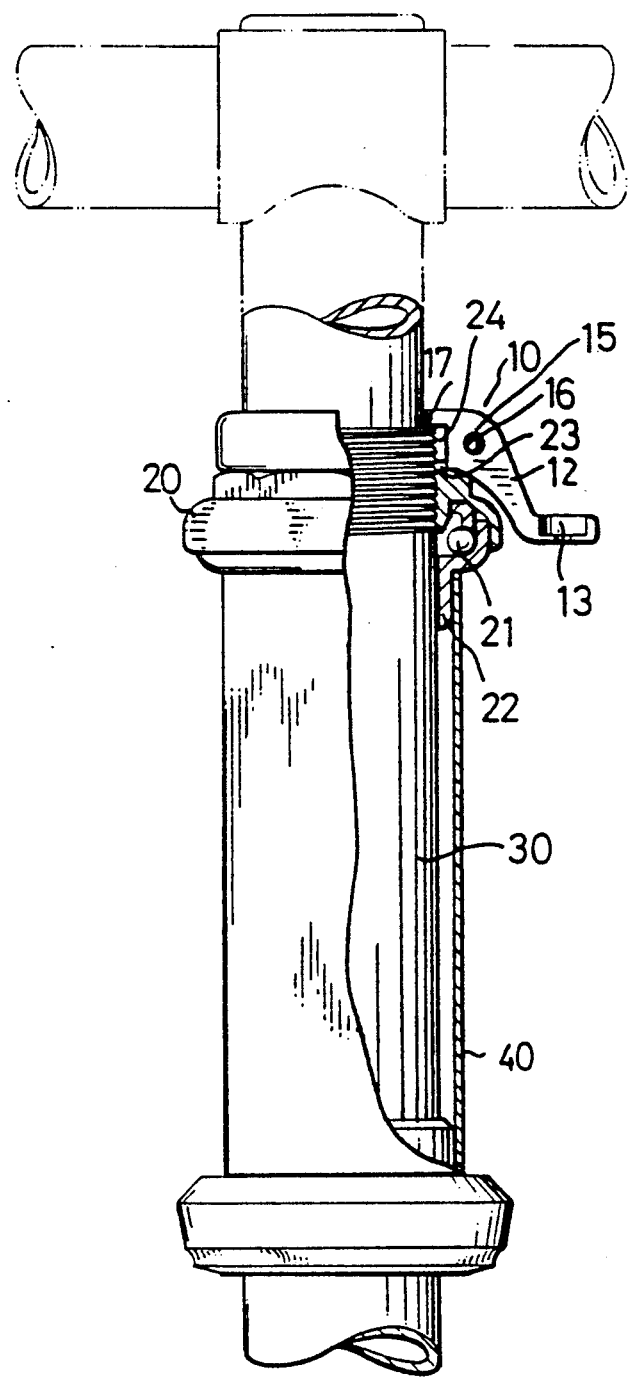
FIG. 2 is a partial cross sectional view of the journal of the bicycle head set.

Referring to the drawings, a journal of a head set in accordance with the present invention comprises a head tube 40, a cap 22 engaged in the upper portion of the head tube 40 and engaged between the head tube 40 and the steerer tube 30, a bearing 21 engaged on the cap 22, a compression nut 20 threadedly engaged on the steerer tube 30 and including an annular flange 23 extended upward therefrom, a gap 24 formed in the annular flange 23 and a pair of fins 25 formed beside the gap 24, and a split ring 10 engaged on the annular flange 23 of the compression nut 20 and including a radial appendage 12 which is substantially triangular in plan and is divided into two half-appendages by a longitudinal split 14, a groove 13 formed in the free end portion of the appendage 12 for supporting a flexible cable, the appendage 12 includes a screw hole 16 for engagement with a bolt 15 and arranged such that the two half-appendages of the appendage 12 can be forced and coupled together by the bolt 15, whereby, the fins 25 of the compression nut 20 are compressed radially inwards to grasp the steerer tube 30 such that the compression tube 20 can be fixed to the steerer nut 30. A sealing ring 17 is engaged between the split ring 10 and the steerer tube 30 for making a water tight seal.

It is to be noted that the annular flange 23 also includes inner thread which is threadedly engaged with the outer thread of the steerer tube 30 such that the outer thread of the steerer tube 30 will not be damaged when the fins 25 are compressed toward the steerer tube 30. In addition, the fins 25 of the annular flange 23 of the compression nut 20 need not be arranged in any particular position relative to the split ring 10 and can be clamped by the split ring 10 when the two half-appendages are coupled together.

Accordingly, the journal in accordance with the present invention includes a simplified configuration and can be easily assembled and can be easily disengaged.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A journal comprising a cap engaged on a steerer tube, a bearing engaged on said cap, a compression nut threadedly engaged on said steerer tube and including an annular flange extended upward therefrom, an inverted T-shaped gap formed in said annular flange and arranged such that a pair of fins are formed in said annular flange, and a split ring engaged on said annular flange of said compression nut and including two half-appendages, and means coupling said two half-appendages together so as to clamp said fins and so as to compress said fins radially inwards to compress said steerer tube, whereby, said compression nut is fixed to said steerer tube.

* * * * *